US012278043B2

(12) United States Patent
Njiende et al.

(10) Patent No.: US 12,278,043 B2
(45) Date of Patent: Apr. 15, 2025

(54) ELECTRONIC APPARATUS AND METHOD OF MANUFACTURING ELECTRONIC DEVICE

(71) Applicant: Delta Electronics (Thailand) Public Co., Ltd., Samutprakarn (TH)

(72) Inventors: Hugues Njiende, Paderborn (DE); Eugen Schwan, Schwerte (DE); Sergey Tikhonov, Bad Sassendorf (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 165 days.

(21) Appl. No.: 18/048,450

(22) Filed: Oct. 21, 2022

(65) Prior Publication Data

US 2023/0125969 A1 Apr. 27, 2023

(30) Foreign Application Priority Data

Oct. 21, 2021 (EP) .................................... 21203991

(51) Int. Cl.

*H01F 41/00* (2006.01)
*H01F 27/02* (2006.01)
*H01F 27/08* (2006.01)

(52) U.S. Cl.

CPC ......... *H01F 41/005* (2013.01); *H01F 27/022* (2013.01); *H01F 27/08* (2013.01)

(58) Field of Classification Search

CPC ............................. H01F 41/005; H01F 27/022
See application file for complete search history.

(56) References Cited

U.S. PATENT DOCUMENTS

2010/0209314 A1 8/2010 Sato
2017/0271075 A1 9/2017 Kitami et al.
(Continued)

FOREIGN PATENT DOCUMENTS

CN 206059088 U 3/2017
CN 113410045 A 9/2021
EP 0923786 A1 6/1999
(Continued)

OTHER PUBLICATIONS

Machine translation JPS56153714A (Year: 1981).*
(Continued)

*Primary Examiner* — Jacob T Minskey
*Assistant Examiner* — Wayne K. Swier
(74) *Attorney, Agent, or Firm* — CKC & Partners Co., LLC

(57) ABSTRACT

The present disclosure concerns a method of manufacturing an electronic device, where the electronic device includes at least one electronic component with at least one electrical winding, and at least one heat dissipation mass coating, and the method includes inserting the at least one electronic component into a cavity; pouring, before or after the insertion of the electronic component, a heat dissipation mass into the cavity so as to at least partially fill the cavity and at least partially cover the electronic component with the heat dissipation mass; removing the electronic device, namely, the electronic component covered by the heat dissipation mass coating, from the cavity. The present disclosure also concerns an electronic apparatus including at least one electronic device manufactured by the foregoing method.

18 Claims, 10 Drawing Sheets

(56) References Cited

U.S. PATENT DOCUMENTS

| | | | |
|---|---|---|---|
| 2020/0234868 | A1 | 7/2020 | Grieger et al. |
| 2021/0005379 | A1 | 1/2021 | Yeo et al. |

FOREIGN PATENT DOCUMENTS

| | | | |
|---|---|---|---|
| EP | 3293740 | A1 | 3/2018 |
| EP | 3633699 | A1 | 4/2020 |
| GB | 823376 | A | 11/1959 |
| JP | S56153714 | A | 11/1981 |
| JP | S59119814 | A | 7/1984 |
| JP | 2015201582 | A | 11/2015 |
| JP | 2015222804 | A | 12/2015 |

OTHER PUBLICATIONS

Machine translation CN113410045 A (Year: 2021).*
Corresponding extended European search report issued on Apr. 19, 2022.

* cited by examiner

ELECTRONIC APPARATUS AND METHOD OF MANUFACTURING ELECTRONIC DEVICE

CROSS-REFERENCE TO RELATED APPLICATION

This application claims priority to European Patent Application No. 21203991.1, filed on Oct. 21, 2021, which is hereby incorporated by reference in its entirety.

TECHNICAL FIELD

The present disclosure concerns a method of manufacturing, in particular potting, an electronic device and an electronic apparatus including at least one electronic device manufactured by the manufacturing method.

BACKGROUND

Conventional electronic devices, for example power converters, include one or more electronic components with at least one electrical winding. In conventional methods of manufacturing these electronic devices, the electronic component with its electrical winding is potted. Therein, the electronic component is placed in a case and the case is filled with resin, which protects the electronic component, especially the electrical winding thereof. Such approaches, however, have the disadvantage that the cases of the electronic device are commonly made of metal, thereby providing good thermal conductivity, but poor electrical insulation. According to other examples, such cases are made of plastics, thereby providing good electrical insulation, but poor thermal conductivity. On the other hand, cases made of ceramics are known. However, such ceramic cases are highly fragile and expensive.

JP 2015222804 A discloses a reactor in which resin moulded products are fixed in a case together with a coil, where the case is substantially rectangular and made of lightweight aluminum or an alloy containing magnesium.

JP 2015201582 A discloses a reactor body that is housed in a case, where a gap between the reactor body and the case is filled with a filler. Therein, the case containing the reactor body is formed of a metal such as aluminum or magnesium.

US 2020/0234868 A1 discloses an inductive component potted in a plastic casing.

These aforementioned approaches have the disadvantage that the case containing the electronic component is made of expensive metals. Further, these cases provide poor electrical insulation. Therefore, an amount of filler material between the respective case and electronic components must be increased so as to prevent an electrical contact between the electronic component and the case.

From EP 0 923 786 A1, a method for producing a high voltage coil subassembly is known in which a primary coil is provided on a moulded bobbin, a bobbin for use as a secondary coil is provided, and bondable magnet wires are wound while the wires are heated. Therein, the primary coil and the secondary coil are encapsulated within electrically insulating thermoplastic resin. Therein, the subassembly is placed in an encapsulation mould, and the resin is then injected into the encapsulation mould. This process, however, has the disadvantage (compared to potting) that high pressures involved in injecting the resin not only damage electrical windings of the electronic components, but are also not suitable for filling all possible voids between the electronic component and the encapsulation mould. Further, the encapsulation moulding machines used therein are expensive and their use and implementation in a manufacturing plant necessitates time and additional attention of workers.

SUMMARY

It is an object of the present disclosure to provide a method of manufacturing an electronic device which can be easily implemented, carried out in a short time, and provide an electronic device with good thermal conductivity and electrical insulation. Further, it is an object of the present disclosure to provide an electronic apparatus including at least one electronic device, where the electronic apparatus has good thermal conductivity and electrical insulation properties.

The solution of these objects is solved by the features of the independent claims. The dependent claims contain advantageous embodiments of the present disclosure.

The present disclosure concerns a method of manufacturing, in particular potting, an electronic device, where the electronic device includes at least one electronic component with at least one electrical winding-preferably at least one magnetic core and at least one electrical winding surrounding the core. In addition, the electronic device includes at least one heat dissipation mass coating. The method of manufacturing the electronic device is carried out as follows. The at least one electronic component is inserted into a cavity. Before or after the insertion of the electronic component, a heat dissipation mass is poured into the cavity so as to at least partially fill the cavity and at least partially, preferably fully, cover the electronic component with the heat dissipation mass. The electronic device, namely the electronic component covered by the coating, is removed from the cavity. In an implementation, the cavity is re-used for manufacturing further electronic devices. The cavity can also be referred to as a pot; however, unlike the usual potting, the cavity is removed after curing.

The method of manufacturing the electronic device of the present disclosure has the advantage that no case for the electronic device is necessary, since the electronic component is covered by the heat dissipation mass coating. In addition, the pouring of the heat dissipation mass into the cavity does not necessitate highly complicated encapsulation machines, and a preferable low pressure with which the heat dissipation mass is poured into the cavity allows for filling substantially all voids between the electronic component and the cavity, and also prevents damage to the electronic component, especially its electrical winding(s).

The heat dissipation mass is preferably poured into the cavity and is especially not injected into the cavity. In other words, the heat dissipation mass is preferably not pressurized during and/or before pouring into the cavity.

In an implementation, the cavity is a cavity of a mould. The shape of the cavity may be adapted to a preferable shape of the electronic device, especially of the heat dissipation mass coating thereof. In an implementation, the cavity is a hollow prism, or hollow cylinder with round or oval cross section.

In an implementation, the mould includes an opening, through which the electronic component can be inserted into the cavity and the heat dissipation mass can be poured into. In a preferred embodiment, the electronic device includes a heat dissipation element and the mould includes an additional opening, which is closed by the heat dissipation element, so that one side of the heat dissipation element is in contact with the electronic component and/or the heat dissipation mass. The two openings of the mold may correspond to two opposing surfaces of the hollow prism or hollow cylinder either each having an opening, or missing entirely. For example, these two opposing surfaces are preferably the top and bottom of the mould (top and bottom of the prism or cylinder).

In an implementation, the mould includes two mould-halves. These mould-halves are preferably pressed together from the outside so as to have sealed-off side surfaces. For instance, the mould-halves are pressed together and held via a clamp, especially a hydraulic clamp.

In an implementation, the two mould-halves taken together define the aforementioned hollow prism or hollow cylinder.

In an implementation, after attaching the electronic component to the heat dissipation element by curing the heat dissipation mass coating, the electronic device is removed from the cavity. Therein, the electronic device is preferably pulled out of the cavity of the mould, or the mould is opened.

In the foregoing and the following, the "heat dissipation mass" refers to the material, especially in its liquid state, that is poured into the cavity. The "heat dissipation mass coating" or "the coating" refers to same material in a cured or hardened state, which coats the electronic component.

As already mentioned, in an implementation, the electronic device includes a heat dissipation element.

The heat dissipation element is preferably plate-shaped. Therein, the method preferably includes positioning the heat dissipation element in or at the cavity before pouring, and attaching the electronic component to the heat dissipation element by curing the heat dissipation mass coating.

In an implementation, the heat dissipation element is inserted into the cavity before the at least one electronic component is inserted into the cavity. The electronic component can then be preferably inserted into the cavity, thereby especially arranging the electronic component on the heat dissipation element. Then, the heat dissipation mass is poured into the cavity.

In an alternative preferred implementation, the heat dissipation element is inserted into the cavity before the at least one electronic component is inserted into the cavity. Then, the heat dissipation mass is poured into the cavity. Following this, the at least one electronic component is inserted into the cavity.

In an implementation, the heat dissipation element is positioned at the cavity before pouring the heat dissipation mass into the cavity. In an implementation, as described above, the cavity includes two openings, especially on opposing sides of the cavity. The heat dissipation element is preferably positioned at the cavity so as to close off one of the two openings of the cavity.

In an implementation, the curing step is performed without the use of curing additives to the heat dissipation mass. In an implementation, the curing step is performed via thermal curing. In this case, the heat dissipation mass is preferably a thermosetting heat dissipation mass.

In an implementation, one side of the heat dissipation element contacts the electronic component and/or the heat dissipation mass coating. Therein, a side opposite to the contacting side is exposed from the heat dissipation mass coating.

In an implementation, the entire contacting side of the heat dissipation element contacts the electronic component and/or the heat dissipation mass coating. In an implementation, a portion of the heat dissipation mass coating is provided between the electronic component and the heat dissipation element.

In an implementation, at least part of the contacting side of the heat dissipation element directly contacts the electronic component and/or directly contacts the heat dissipation mass coating.

In an implementation, the method further includes at least partially wrapping an outer surface of the at least one heat dissipation mass coating and/or an exposed surface of the at least one heat dissipation element with a polyimide film. This has the advantage that the electrical insulation properties of the electronic device can be further improved.

In an implementation, only portions of the outer surfaces of the heat dissipation mass coating, which correspond to a shape and/or size of the electrical windings of the electronic component, are wrapped in the polyimide film. Thereby, the electrical insulation properties can be increased, while also saving material costs.

In an implementation, only side surfaces, especially only portions of the side surfaces, of the heat dissipation mass coating are wrapped in the polyimide film. In other words, preferably the top and/or bottom of the heat dissipation mass coating are not wrapped in the polyimide film.

In an implementation, the polyimide film is Kapton®.

Advantageously, the electronic device further includes a thermal cooling plate. Therein, the method preferably includes attaching the thermal cooling plate to the at least one heat dissipation element, especially after the removal of the electronic device from the cavity.

In an implementation, the thermal cooling plate is directly attached to the at least one heat dissipation element. Thereby, a gap filler can be provided between the thermal cooling plate and the at least one heat dissipation element. For example, thermal paste or thermal glue is used as a gap filler with high thermal conductivity.

In an implementation, the thermal cooling plate is attached, especially directly, to the at least one heat dissipation element before the removal of the electronic device from the cavity. For example, the heat dissipation element is positioned at the cavity before pouring, the thermal cooling plate is attached to the at least one heat dissipation element, and the heat dissipation mass is poured into the cavity either before or after the insertion of the electronic component into the cavity.

In an implementation, the thermal cooling plate is a chassis, a so-called "cold plate". The thermal cooling plate may further advantageously include cooling fins for improved heat dissipation.

In addition or alternatively thereto, the thermal cooling plate may further include channels for circulation of a cooling fluid therethrough.

Further advantageously, the heat dissipation mass coating contacts at least one circumferential outer surface of the heat dissipation element. In an implementation, an outer circumferential diameter of the heat dissipation element is equal to or smaller than an inner circumferential diameter of the cavity. In this case, "equal diameters" means that the heat dissipation element contacts, especially at all circumferential outer surfaces thereof, the circumferential inner surface of the cavity. Further, a smaller outer circumferential diameter of the heat dissipation element than the inner circumferential diameter of the cavity means that at least, especially all, outer circumferential surfaces of the heat dissipation element do/does not contact one or all inner circumferential surfaces of the cavity. Therein, in the case that one or all circumferential outer surfaces of the heat dissipation element do not contact one or all inner circumferential surfaces of the cavity, the heat dissipation mass poured into the cavity fills a gap between the outer circumferential surface(s) of the heat dissipation element and the circumferential inner surface(s) of the cavity.

In an implementation, at least the insertion of the at least one electronic component and/or the pouring of the heat dissipation mass are carried out under vacuum. For example, the mould may be vacuumed. In addition or alternatively thereto, a room in which at least one of the aforementioned method steps is carried out may be under vacuum. Thereby, air bubbles possibly being formed in the heat dissipation mass, especially during curing thereof, may be removed or prevented from forming.

In an advantageous embodiment, the method may further include an additional potting step, in which the electronic device is additionally potted after removing it from the cavity.

In an implementation, the additional potting step pots the electronic device together with the heat dissipation element. In an implementation, the additional potting step pots the electronic device with the thermal cooling plate. In an implementation, the additional potting step pots the electronic device together with the polyimide film. Advantageously, the potting material of this additional potting step forms the case of the electronic device. Further advantageously, in this additional potting step, the electronic device, especially together with any one of the aforementioned elements, may be potted in an additional case. This additional case may especially be formed of metal, plastic, or ceramic.

In an implementation, the steps of inserting the at least one electronic component into a cavity and pouring, before or after the insertion of the electronic component, the heat dissipation mass into the cavity may be repeated any number of times. In an implementation, the aforementioned steps may be repeated two, three, preferably four or more times. Therein, the size of the respective cavity for each of the aforementioned repetitions may be sequentially increased. Thereby, a plurality of heat dissipation mass coatings may be provided.

In an implementation, the additional steps of positioning a heat dissipation element in or at the respective cavity may also be repeated, especially repeated for each aforementioned repetition of insertion and pouring. In an implementation, the step of wrapping with a polyimide film may also be repeated, especially repeated with or between each aforementioned repetition. In an implementation, the step of attaching a thermal cooling plate may also be repeated, especially with each repetition. In other words, the electronic device may include one or more heat dissipation mass coatings and/or one or more heat dissipation elements and/or one or more polyimide films and/or one or more thermal cooling plates, especially respectively each for each aforementioned repetition of the insertion and pouring steps.

Advantageously, the at least one heat dissipation coating is a thermal glue. In an implementation, the heat dissipation coating includes an epoxy resin and/or a silicone resin.

In an implementation, the at least one heat dissipation element is a ceramic plate. In an implementation, the heat dissipation element is a plate including a composite of silicone rubber and/or fiberglass.

Advantageously, the heat dissipation element is a Sil-Pad®. In an implementation, the heat dissipation plate may be formed of a combination of the aforementioned materials. For example, the heat dissipation plate may be formed of at least one layer and/or section of Sil-Pad® and at least one layer and/or section of ceramic plate material.

In an implementation, the at least one heat dissipation element has a circular or rectangular plate-like shape. In an implementation, the heat dissipation element has a cornered or rounded oblong plate-like shape.

In an implementation, the heat dissipation element includes at least one protruding portion. Advantageously, the at least one protruding portion of the heat dissipation element protrudes into the electronic component, especially between multiple separate electrical windings or multiple separate electrical winding portions of a single electrical winding of the electronic component. In other words, the at least one protruding portion of the heat dissipation element preferably protrudes into the electronic component. In an implementation, the at least one protruding portion of the heat dissipation element protrudes into the cavity, so as to be arranged between the mould and the electronic component. In an implementation, the protruding portion may be formed so as to define a wall protruding into the cavity and surrounding at least a part of the electronic component.

In an implementation, the electronic device includes two or more and/or three or more and/or four or more electronic components, each including at least one electrical winding. In an implementation, each of the electronic component(s) includes one or more magnetic core(s).

In an implementation, the electronic component, especially the at least one electrical winding thereof, includes outer leads, which are connected to the at least one electrical winding and protrude outwards from the heat dissipation mass coating.

In an implementation, the at least one electrical winding is an enameled wire. In an implementation, the wire, especially the enameled wire, is a round wire and/or square wire and/or a litz wire.

In an implementation, the electronic device does not include any additional insulation for insulating the enameled wires apart from the heat dissipation mass coating. In an implementation, the electronic device does not include any additional insulation insulating the magnetic components thereof apart from the heat dissipation mass coating.

In an implementation, a thickness of the heat dissipation mass coating, i.e. a distance from an outer surface of the heat dissipation mass to an outer surface of the electronic device covered by the heat dissipation mass coating, is, preferably at all points of the electronic device, between and including a maximum and a minimum. Therein, the maximum is preferably 20 mm, more preferably 10 mm, more preferably 5 mm. In addition or alternatively thereto, the minimum is preferably 0.5 mm, more preferably 0.8 mm, more preferably 1 mm. In an implementation, the thickness of the heat dissipation mass coating, especially after curing, is one of the aforementioned values.

In addition, one or more of the aforementioned steps of the manufacturing method can be automated. For instance, due to an advantageously easy handling of the electronic device (especially in the case of a cuboid shape of the electronic component covered by the coating), any one or more of the aforementioned steps may be carried out by a robot, especially a robot arm. In an implementation, the step of wrapping an outer surface of the heat dissipation mass coating and/or the exposed surface of the at least one heat dissipation element is carried out with a robot.

The outer leads of the electronic component are preferably connected to further components of the electronic apparatus, for example a control device, or a battery connected to the electronic apparatus or being a component thereof.

The method of manufacturing the electronic device preferably includes steps of manufacturing the electronic component. In an implementation, the method of manufacturing includes the step of winding the electrical winding around a bobbin of the electronic component.

In an implementation, the method of manufacturing the electronic device includes a step of winding the electrical winding around the one or more magnetic core(s). In an implementation, this step is performed in addition or alternatively to winding the electrical winding around a bobbin of the electronic component. In other words, the electronic component preferably does not include a bobbin. In an implementation, the electrical windings are pre-wound and then inserted in the electronic component. For example, the electrical windings are wound on an element separate from the electronic component, removed from said element, and then placed on or around the magnetic core(s) of the electronic component in a wound state.

The present disclosure further concerns an electronic apparatus. In an implementation, the electronic apparatus is a charging apparatus for charging batteries. Therein, the electronic apparatus includes at least one electronic device manufactured by the method according to any one of the foregoing preferable embodiments.

Advantageously, the at least one electronic component of the at least one electronic device is a power electronic device, preferably a power conversion device.

The foregoing advantageous embodiments of the method of manufacturing have the following advantages. Homogenous insulation of the electronic component(s) is ensured, and in particular less air inclusions are formed between the electronic component, especially the electrical winding, and the heat dissipation mass. Further, no additional insulation tubes are included for insulating the outer leads. Thereby, the material costs of the electronic device can be reduced. The advantageous insulation properties described above prevent high voltage fails or short circuits in the electronic device. In addition, the aforementioned electronic device has good thermal coupling properties with regard to a chassis (for instance, the thermal cooling plate). In addition, the shape of the electronic device can be easily manipulated by changing the shape of the mould/cavity. Thereby, the thermal coupling properties can be further improved. In addition, mechanical tolerances of the electronic device are also improved thereby and are adjustable, for instance via adjustment of the thickness of the heat dissipation mass. Advantageously, the curing process for curing the heat dissipation mass is short in the foregoing embodiments, thereby decreasing a manufacturing time for the electronic device.

BRIEF DESCRIPTION OF DRAWINGS

Further details, advantages, and features of the preferred embodiments of the present disclosure are described in detail with reference to the figures.

DESCRIPTION OF EMBODIMENTS

Figure 1:
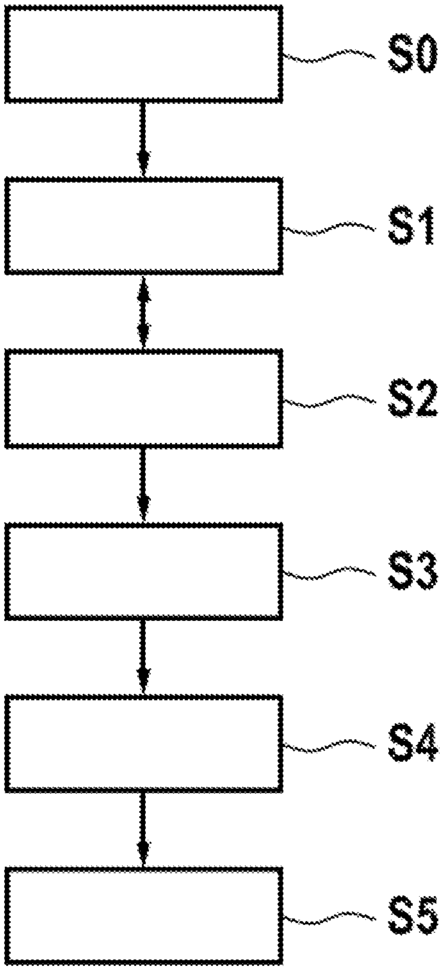
FIG. 1 shows a block diagram of a method of manufacturing an electronic device according to a first embodiment of the method of manufacturing.

In the following explanations and drawings, functionally similar or equal features and elements have the same reference numerals and a repeated explanation of these may be omitted.

Figure 3:
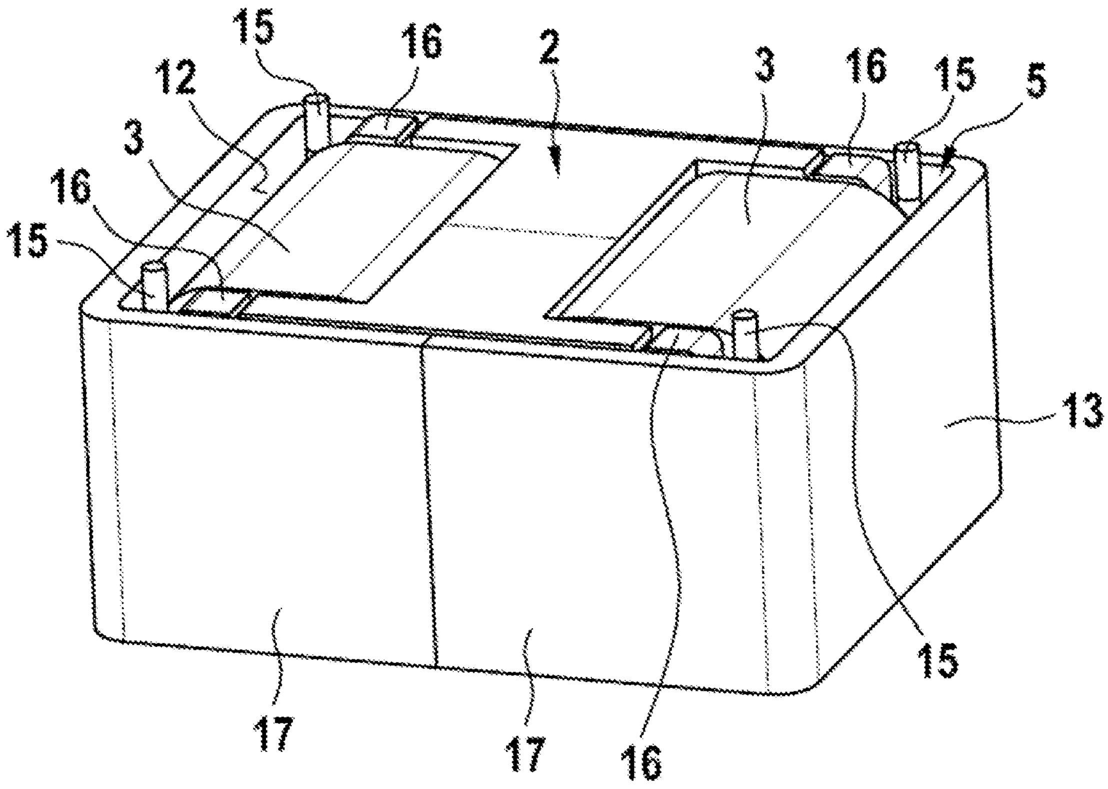
FIG. 3 shows a schematic drawing of an intermediate electronic device and a mould during a manufacturing step of the method of manufacturing according to the first embodiment.
Figure 4:
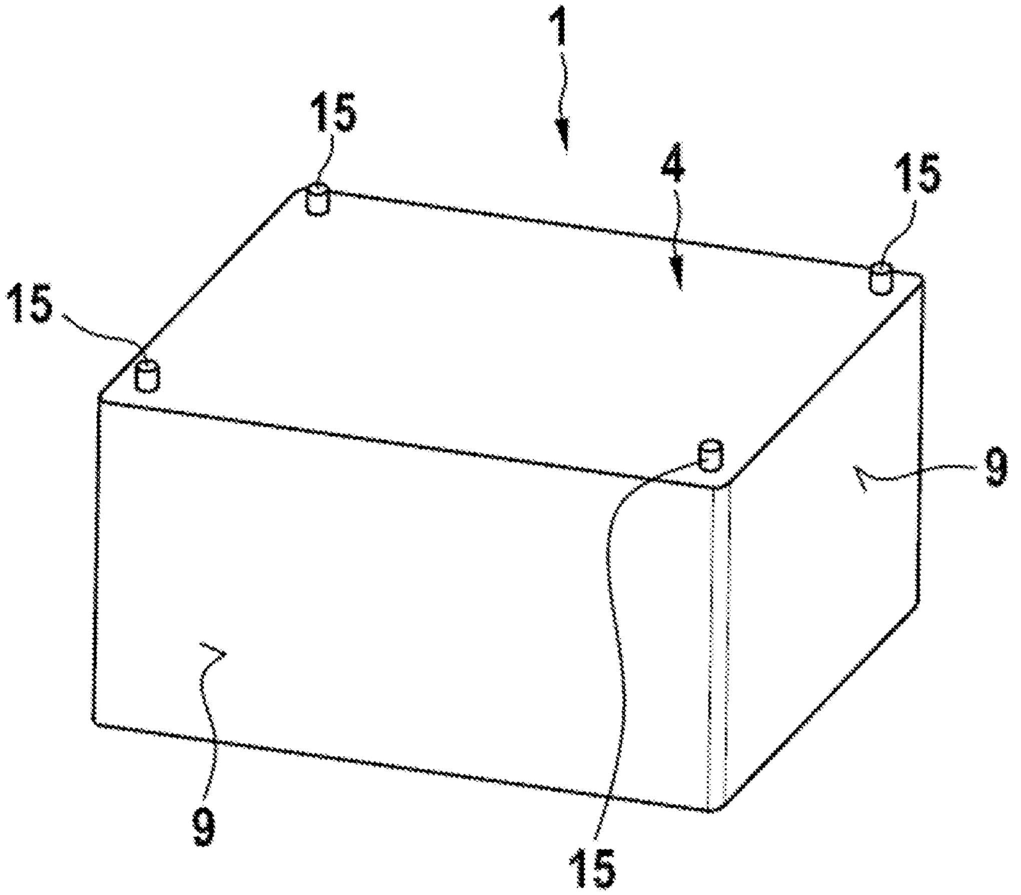
FIG. 4 shows a schematic drawing of a first embodiment of an electronic device after the method of manufacturing according to the first embodiment of the method of manufacturing.

FIG. 1 shows a block diagram of a method of manufacturing an electronic device 1 according to a first embodiment of the method of manufacturing. The method of manufacturing the electronic device 1 will be explained in the following with respect to FIGS. 2 to 4, where each of FIGS. 2 to 4 shows a schematic drawing of the electronic device 1 at intermediate or final steps of the method of manufacturing according to the first embodiment thereof.

As an initial first step S0, an electronic component 2 with two electrical windings 3 is manufactured. The electronic component 2 is manufactured by winding electrical windings 3 around bobbins 16. The bobbins 16 are supported and held in a core 14. The core 14 further holds one or more magnetic core(s) (not visible), which interact(s) magnetically/electrically with the electrical windings 3.

The electronic component 2 does not necessarily need to include the bobbins 16. In addition or alternatively to winding the electrical windings 3 around bobbins 16 of the electronic component 2, the electrical windings 3 may be directly wound around the core 14 and/or the magnetic core(s) (see for example FIG. 7). In this case, the electrical windings 3 may also be pre-wound and inserted into the electronic component 2. For example, the electrical windings 3 are pre-wound on an element separate from the electronic component 2. Then, the pre-wound electrical windings 3 are slid onto the core 14 and/or the magnetic core(s).

Figure 2:
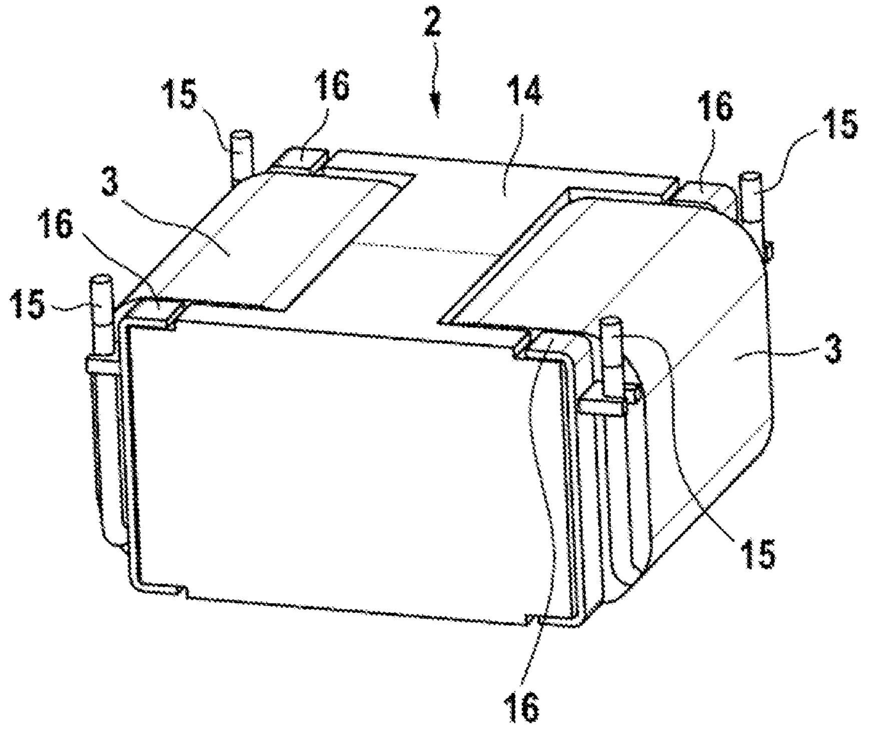
FIG. 2 shows a schematic drawing of an intermediate electronic device during a manufacturing step of the method of manufacturing according to the first embodiment.

As can be seen from FIG. 2, the electronic component 2 further includes four outer leads 15.

The outer leads 15 are connected to the electrical windings 3. The electronic component 2 is supplied with power and/or supplies power via the outer leads 15.

Referring back to FIG. 1, in a second step S1, and as shown in FIG. 3, the electronic component 2 is inserted into a cavity 5 of a mould 13.

In this exemplary embodiment, the mould 13 includes two mould-halves 17. These mouldhalves 17 are pressed together from the outside so as to have sealed-off side surfaces. For instance, the mould-halves 17 are pressed together and held via a clamp, especially a hydraulic clamp.

In a further step S2, the cavity 5 of the mould 13 is filled with a heat dissipation mass in a liquid state. In an implementation, the heat dissipation mass is a thermal glue, for instance including epoxy resin and/or silicone resin.

As denoted by the double arrow in FIG. 1 between steps S1 and S2, the cavity 5 of the mould 13 may be filled with the heat dissipation mass before the electronic component 2 is inserted into the cavity 5. In other words, step S2 may be carried out before step S1.

In step S2, the heat dissipation mass is poured into the cavity 5 of the mould 13. The heat dissipation mass is especially not injected into the cavity 5 of the mould 13.

In a further step S3, the heat dissipation mass is cured. The curing is performed with or without the use of additives. In an implementation, the heat dissipation mass includes a thermosetting resin. In an implementation, the heat dissipation mass is cured via a thermal process, especially without the use of additives.

After curing has been completed, and the heat dissipation mass is hardened, the electronic device 1 is removed from the cavity 5 in a further step S4.

Figure 5:
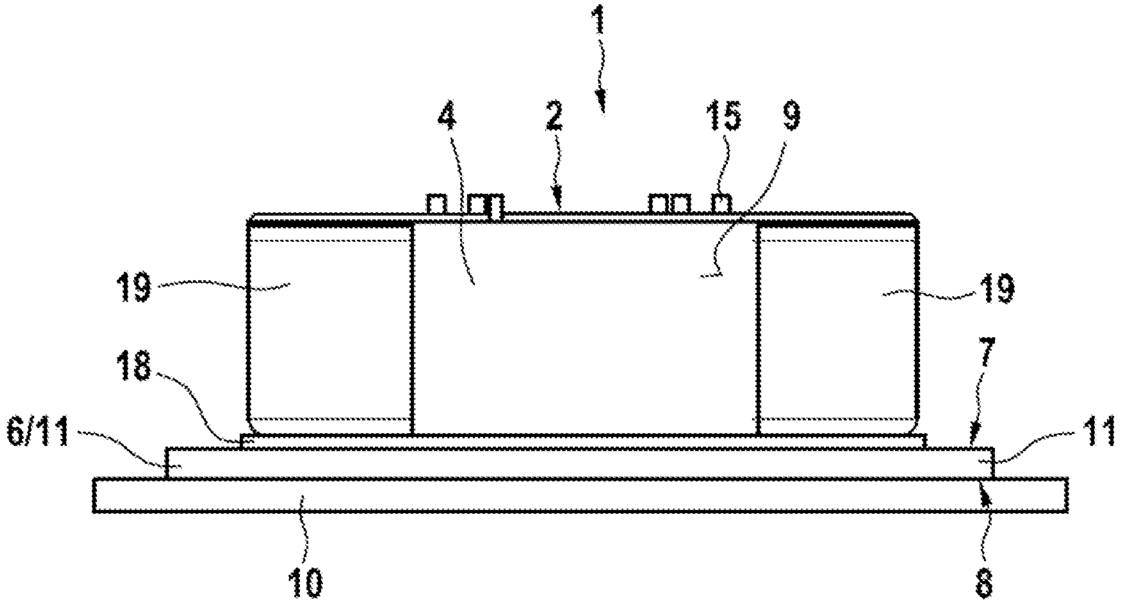
FIG. 5 shows a schematic drawing of a second embodiment of an electronic device after a method of manufacturing according to a second embodiment of the method of manufacturing.

The electronic device 1 includes the electronic component 2 shown in FIG. 5 as well as a heat dissipation mass coating 4, which is the result of curing the heat dissipation mass.

The heat dissipation mass coating 4 covers the electronic component 2 and provides electrical insulation thereof. In addition, the heat dissipation mass coating 4 provides excellent thermal conductivity properties.

As can be taken from FIG. 4, the finished electronic device 1 does not include a case. Instead, the heat dissipation mass coating 4 provides the functions of a case, namely protecting and insulating the electronic component 2, while simultaneously provided high thermal conductivity.

Further, the outer leads 15 of the electronic component protrude upwards from the heat dissipation mass coating 4. Thereby, the electronic component 2 covered by the heat dissipation mass coating 4 can be connected to further components such as a power source and/or control device.

In addition, in a further step S5, the electronic device 1 shown in FIG. 4 is wrapped in a polyimide film (due to its transparency, the polyimide film is not shown/not visible in FIG. 4). Specifically, the polyimide film is preferably Kapton®, preferably Kapton® tape. For example, Kapton® CRC and/or Kapton® EN may be employed herein. This provides additional electrical insulation of the electronic device 1, specifically of the electronic component 2.

More specifically, in step S5, outer surfaces 9 of the heat dissipation mass coating 4 are wrapped in Kapton®. Herein, only portions of the outer surfaces 9 of the heat dissipation coating 4, which correspond to a shape of the electrical windings 3 of the electronic component 2, are wrapped in Kapton®. Thereby, the electrical insulation properties can be increased, while also saving material costs.

Due to the cuboid shape of the electronic device 1, the process of wrapping the polyimide film can be easily automated, so as in particular to be carried out by a robot.

FIG. 5 shows a schematic drawing of the electronic device 1 after a method of manufacturing according to a second embodiment of the method of manufacturing.

Therein, in addition to the electronic component 2 and the heat dissipation mass coating 4 described above, the electronic device 1 includes a heat dissipation element 6.

In this exemplary embodiment, the heat dissipation element 6 is a Sil-Pad® or a ceramic plate.

The heat dissipation element 6 is attached to the heat dissipation mass coating 4 via a filler 18.

The filler 18 is preferably a thermal glue. The filler 18 fills possible gaps produced in the heat dissipation mass coating 4, especially via uneven portions of the mould 13. Thereby, excellent thermal conductivity from the heat dissipation mass coating 4 to the heat dissipation element 6 is achieved.

Further, the electronic device 1 includes a thermal cooling plate 10. As shown, the thermal cooling plate 10 is a chassis, a so-called "cold plate". The thermal cooling plate 10 may further include cooling fins for improved heat dissipation. In addition or alternatively thereto, the thermal cooling plate 10 may further include channels for circulation of a cooling fluid therethrough.

In this exemplary embodiment, the thermal cooling plate 10 is attached, as a further manufacturing step, directly to the heat dissipation element 6. In other examples, further fillers such as thermal glue may be disposed between the heat dissipation element 6 and the thermal cooling plate 10.

Additionally, the electronic device 1 includes the polyimide film 19, which is wrapped around an outer surface 9 of the heat dissipation mass coating 4, as explained above. As can be taken from a comparison of FIG. 5 with FIG. 2, the polyimide film 19 is only wrapped around portions of the outer surface 9 corresponding to the electrical windings 3 of the electronic component 2.

In particular, only side surfaces of the heat dissipation mass coating 4 are wrapped in the polyimide film 19.

Further, in this exemplary embodiment, a case is shown in which the heat dissipation element 6 is provided outside of and is attached to the heat dissipation mass coating 4. In other words, the steps S1 and S2 as well as S3 were carried out before providing and attaching the heat dissipation element 6.

In a further exemplary embodiment, the heat dissipation element 6 is inserted into the cavity 5 (see: FIG. 3). In this case, the heat dissipation element 6 is inserted into the cavity 5 before the electronic component 2 is inserted therein. Then, the heat dissipation mass is poured into the cavity 5 and subsequently cured.

Alternatively, the heat dissipation element 6 may be inserted into the cavity 5 after pouring has been completed, especially before the electronic component 2 is inserted into the cavity 5. In another exemplary embodiment, the heat dissipation element 6 may be positioned at the cavity 5 before pouring. In this case, the heat dissipation element 6 is positioned at an opening of the mould 13. For example, in FIG. 3, the mould 13 may have an open bottom. Before pouring, the heat dissipation element 6 is positioned so as to abut against the bottoms of the side surfaces of the mould 13, i.e. so as to abut the open bottom. Then, the cavity 5 of the mould 13 is filled, via the open top thereof, with the heat dissipation mass. After curing is performed, the heat dissipation mass coating 4 adheres the heat dissipation element 6 to the electronic component 2. The mould 13 can then be opened, via the two mould-halves 17, or, depending on the size of the open bottom and the size of the heat dissipation element 6, the electronic device 1 can be pulled out of the mould 13 with the heat dissipation element 6 attached to the electronic component 2.

Especially in the case that the heat dissipation element 6 is inserted into the cavity 5, the mould 13 having a closed bottom, the heat dissipation mass is in contact with circumferential outer surfaces 11 (see: FIG. 5) of the heat dissipation element 6. In other words, the heat dissipation mass coating 4 surrounds an outer circumference of the heat dissipation element 6.

In any of the foregoing cases in which the heat dissipation element 6 is also sealed by the heat dissipation mass coating 4, before attaching the thermal cooling plate 10, the heat dissipation element 6 includes a covered side 7 (see: FIG. 5) in contact with the electronic component 2 (either directly when sealed by the heat dissipation mass coating 4, or via the gap filler 18 when attached to the outside). Further, the heat dissipation element 6 includes a side opposite thereto which is at least partially exposed from the heat dissipation mass coating 4. The thermal cooling plate 10 is attached to the exposed side 8 of the heat dissipation element 6.

With reference to FIGS. 6 to 11, different configurations of the electronic component 2 and the heat dissipation element 6 will be described. Therein, FIGS. 6 to 11 each show a schematic drawing of an electronic component 2 and a heat dissipation element 6 used in the manufacturing methods according to the embodiments.

Figure 6:
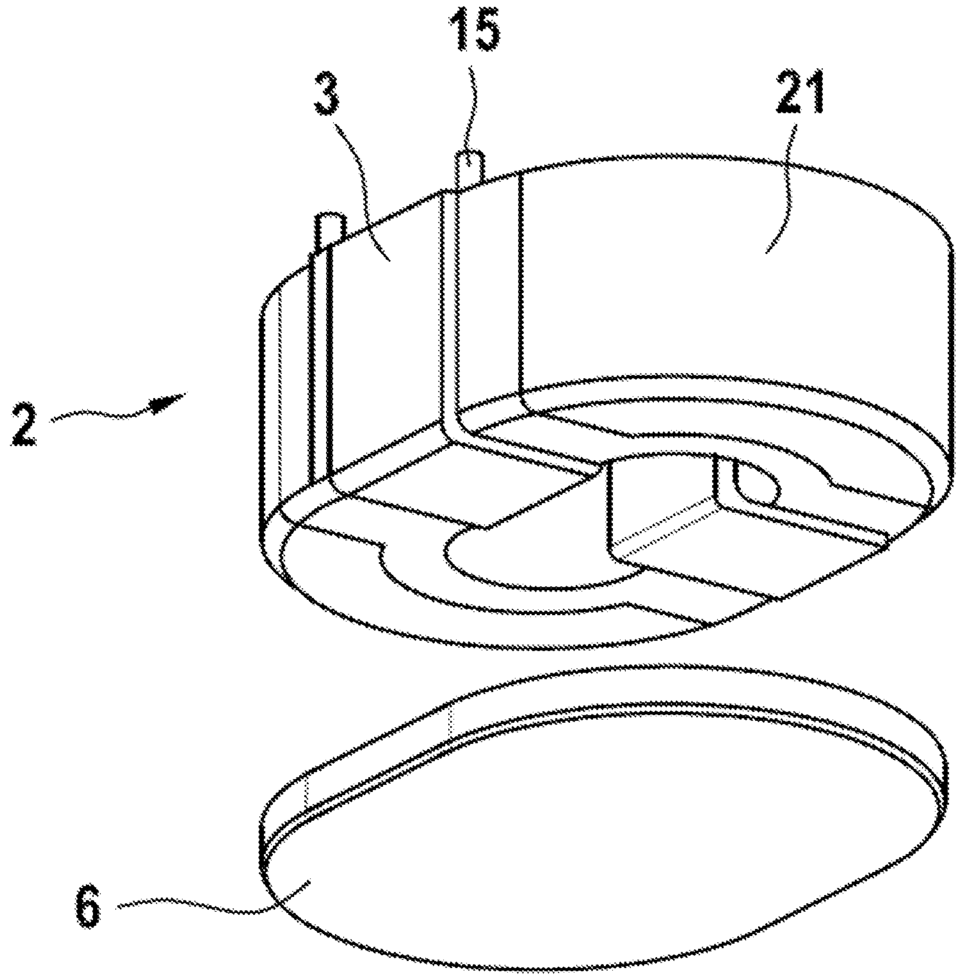
FIG. 6 shows an example of an electronic component and a heat dissipation element used in the method according to one of the embodiments.

As can be taken from FIG. 6, the heat dissipation element 6 has a rounded oblong shape, i.e. a shape that is longer than it is wide. The heat dissipation element 6 may also be of an ellipse shape. In this case, the electronic component 2, especially a magnetic core 21 of the electronic component 2, is also of a rounded oblong shape. In other words, the shape of the electronic component 2 corresponds to the shape of the heat dissipation element 6. Thereby, excellent heat dissipation by the heat dissipation element 6 can be achieved.

Figure 7:
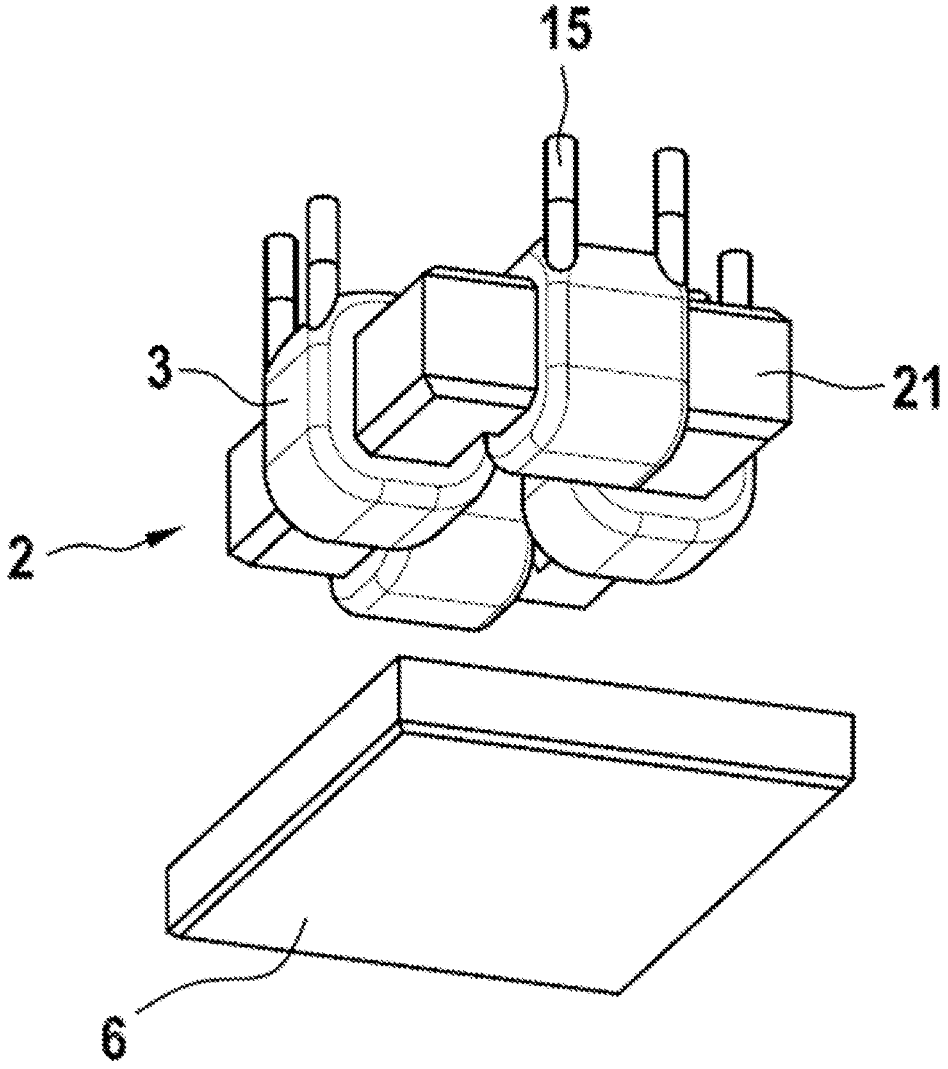
FIG. 7 shows a further example of an electronic component and a heat dissipation element used in the method according to one of the embodiments.

As can be taken from FIG. 7, the heat dissipation element 6 and the electronic component 2 can have square shapes.

Figure 8:
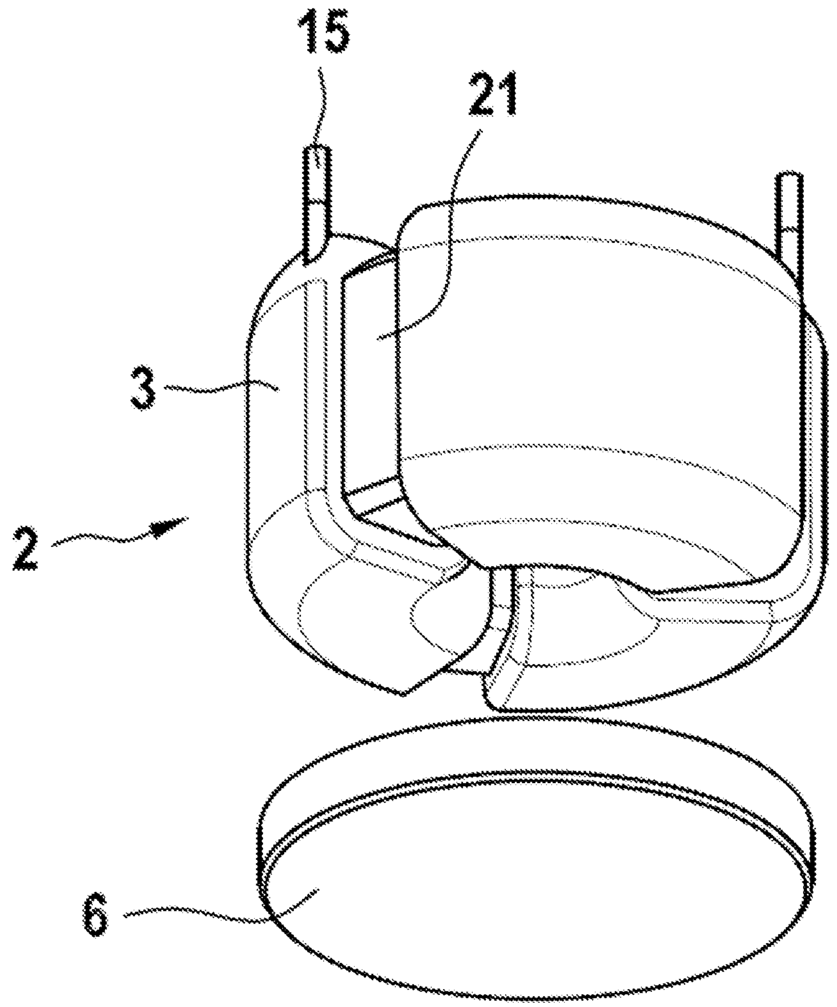
FIG. 8 shows a further example of an electronic component and a heat dissipation element used in the method according to one of the embodiments.

As can be taken from FIG. 8, the heat dissipation element 6 and the electronic component 2 can have circular shapes.

Figure 9:
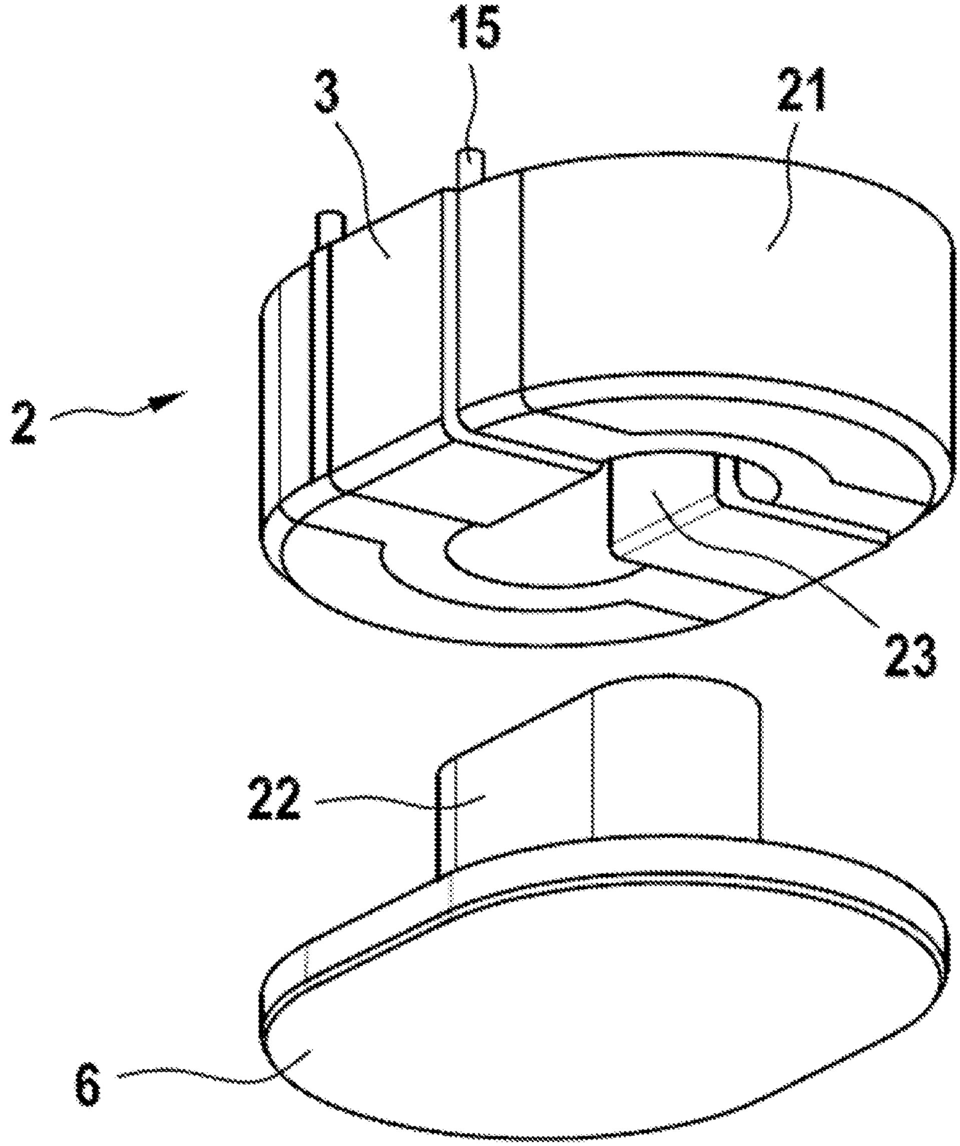
FIG. 9 shows a further example of an electronic component and a heat dissipation element used in the method according to one of the embodiments.
Figure 10:
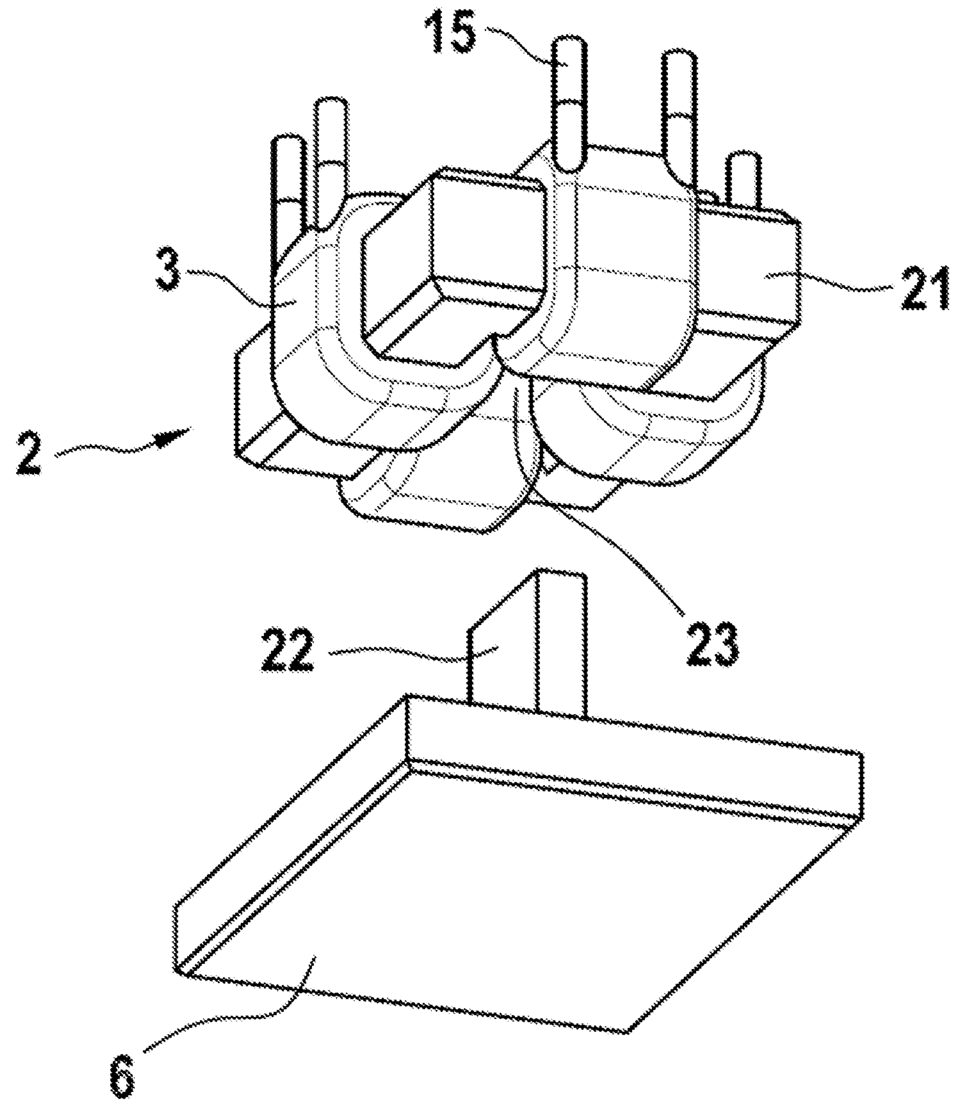
FIG. 10 shows a further example of an electronic component and a heat dissipation element used in the method according to one of the embodiments.
Figure 11:
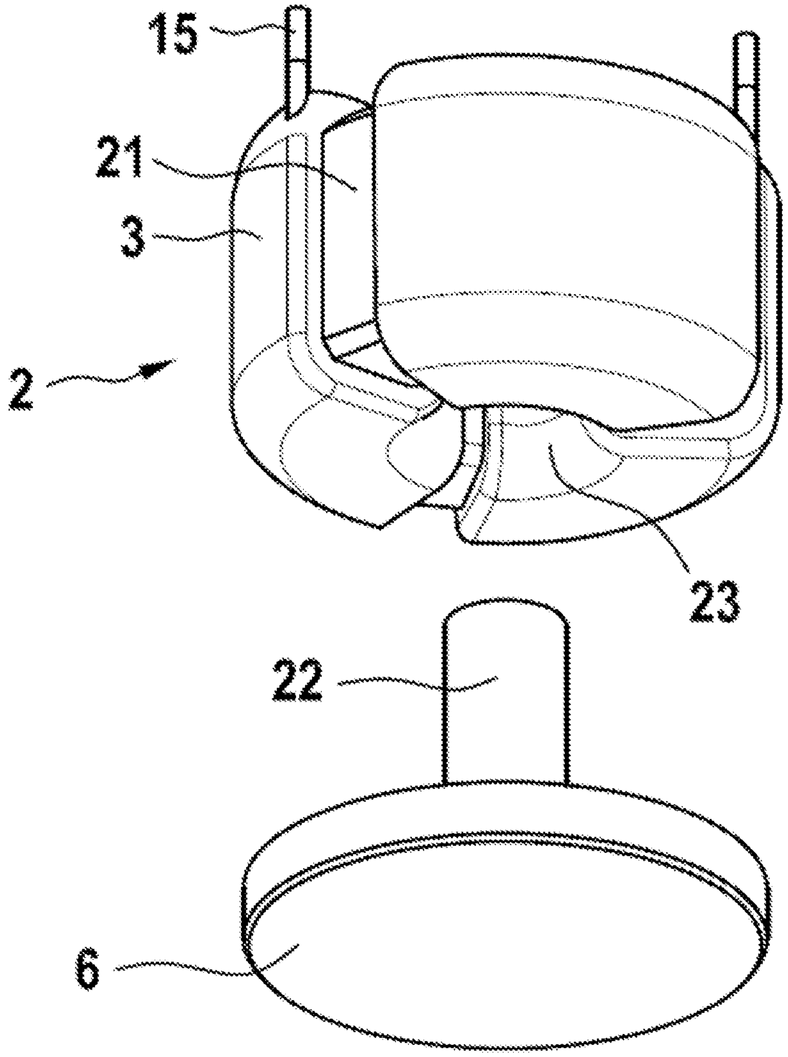
FIG. 11 shows a further example of an electronic component and a heat dissipation element used in the method according to one of the embodiments.

FIGS. 9 to 11 essentially show similar configurations as shown in FIGS. 6 to 8, where the heat dissipation element 6 further includes a projection 22 protruding into the electronic component 2.

The shape of the respective projection 22 corresponds to the shape of an opening 23 of the electronic component 2. The shape of the opening 23 is defined by the shape and size of the magnetic core 21 as well as of the electrical windings 3 wound around the magnetic core 21.

The configurations shown in embodiments six to eight are especially suited for sealing the heat dissipation element 6 with the heat dissipation mass coating 4. Therein, the projection 22 of the heat dissipation element 6 is inserted into the electronic component 2 before curing the heat dissipation mass to form the heat dissipation mass coating 4.

Thereby, the heat dissipation element 6 not only provides excellent thermal conductivity, but simultaneously further electrically insulates the electrical windings 3 from each other.

The heat dissipation element 6 can further include walls, in addition or alternatively to the projection 22, which surround the electronic component 2.

Figure 12:
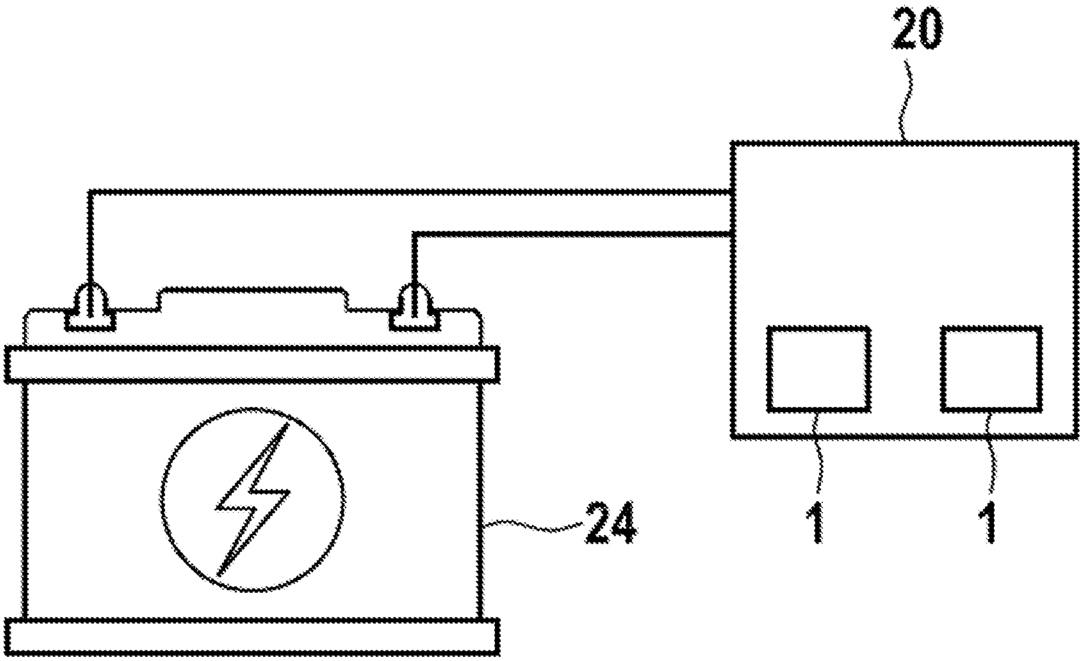
FIG. 12 shows a schematic drawing of an electronic apparatus including an electronic device manufactured according to any one of the embodiments.

FIG. 12 shows a schematic drawing of an electronic apparatus 20 including an electronic device 1 manufactured according to any one of the foregoing embodiments.

In particular, the electronic apparatus 20 includes two electronic devices 1, which are each manufactured as elucidated above.

Further, the electronic apparatus 20 is connected to a battery 24. The electronic apparatus 20 in this exemplary embodiment is a charging apparatus for charging the battery 24. In particular, the electronic apparatus 20 is a power conversion device for supplying power to and from the battery 24.

By the aforementioned manufacturing steps and configurations of the electronic device 1, the electronic component 2, and the electronic apparatus 20, an electronic apparatus 20 is provided with excellent heat dissipation properties. In addition, due to the excellent insulation properties especially due to the heat dissipation mass coating 4, the electronic apparatus 20 is highly suitable for high-voltage applications, especially with a lower likelihood of voltage breakdowns or short-circuits.

In addition to the foregoing written explanation of the present disclosure, it is explicitly referred to FIGS. 1 to 12, which in detail show features of the present disclosure.

REFERENCE SIGNS 1 electronic device
2 electronic component
3 electrical winding
4 heat dissipation mass coating
5 cavity
6 heat dissipation element
7 covered side of the heat dissipation element
8 exposed side of the heat dissipation element
9 outer surface
10 thermal cooling plate
11 outer circumferential surface of the heat dissipation element
12 inner circumferential surface of mould
13 mould
14 core
15 outer leads
16 bobbin
17 mould-halves
18 filler
19 polyimide film
20 electronic apparatus
21 magnetic core
22 projection
23 opening
24 battery

What is claimed is:

1. A method of manufacturing an electronic device, wherein the electronic device comprises at least one electronic component with at least one electrical winding, and at least one heat dissipation mass coating, wherein the method comprises:

inserting the at least one electronic component into a cavity;

pouring, before or after the insertion of the electronic component, a heat dissipation mass into the cavity so as to at least partially fill the cavity and at least partially cover the electronic component with the heat dissipation mass; and removing the electronic device from the cavity;

wherein the electronic device comprises a heat dissipation element, wherein the method comprises: positioning the heat dissipation element in or at the cavity before pouring, and attaching the electronic component to the heat dissipation element by curing the heat dissipation mass coating.

2. The method according to claim 1, wherein removing the electronic device from the cavity comprises:

removing the electronic component covered by the heat dissipation mass coating from the cavity.

3. The method according to claim 1, wherein a covered side of the heat dissipation element contacts the electronic component and/or the heat dissipation mass coating and wherein an opposite side is exposed from the heat dissipation mass coating.

4. The method according to claim 1, further comprising a polyimide film at least partially wrapping an outer surface of the at least one heat dissipation mass coating and/or an exposed side of the at least one heat dissipation element.

5. The method according to claim 2, further comprising a polyimide film at least partially wrapping an outer surface of the at least one heat dissipation mass coating and/or an exposed side of the at least one heat dissipation element.

6. The method according to claim 3, further comprising at least partially wrapping an outer surface of the at least one heat dissipation mass coating and/or an exposed side of the at least one heat dissipation element with a polyimide film.

7. The method according to claim 1, wherein the electronic device further comprises a thermal cooling plate, wherein the method further comprises attaching the thermal cooling plate to the at least one heat dissipation element.

8. The method according to claim 3, wherein the electronic device further comprises a thermal cooling plate, wherein the method further comprises attaching the thermal cooling plate to the at least one heat dissipation element.

9. The method according to claim 4, wherein the electronic device further comprises a thermal cooling plate, wherein the method further comprises attaching the thermal cooling plate to the at least one heat dissipation element.

10. The method according to claim 7, wherein attaching the thermal cooling plate to the at least one heat dissipation element comprises:

after the removal of the electronic device from the cavity, attaching the thermal cooling plate to the at least one heat dissipation element.

11. The method according to claim 1, wherein the heat dissipation mass coating contacts at least one circumferential outer surface of the heat dissipation element.

12. The method according to claim 1, wherein at least the insertion of the at least one electronic component and/or the pouring of the heat dissipation mass are carried out under vacuum.

13. The method according to claim 1, further comprising an additional potting step of potting the electronic device after removing it from the cavity.

14. The method according to claim 1, wherein the at least one heat dissipation mass coating is a thermal glue.

15. The method according to claim 14, wherein the thermal glue comprises epoxy resin and/or silicone resin.

16. The method according to claim 1, wherein the at least one heat dissipation element comprises a ceramic plate and/or a plate comprising a composite of silicone rubber and/or fiberglass.

17. An electronic apparatus, comprising at least one electronic device manufactured by the method according to claim 1.

18. The electronic apparatus according to claim 17, wherein the at least one electronic component of the at least one electronic device comprises a power electronic device, and wherein the power electronic device comprises a power conversion device.

* * * * *